(12) United States Patent
Baba et al.

(10) Patent No.: US 10,149,349 B2
(45) Date of Patent: Dec. 4, 2018

(54) HEAT GENERATING BODY

(71) Applicants: Mitsuko Baba, Fukuoka (JP);
Takayuki Domaru, Fukuoka (JP)

(72) Inventors: Mitsuko Baba, Fukuoka (JP);
Takayuki Domaru, Fukuoka (JP)

( * ) Notice: Subject to any disclaimer, the term of this patent is extended or adjusted under 35 U.S.C. 154(b) by 0 days.

(21) Appl. No.: 15/317,095

(22) PCT Filed: Jun. 9, 2014

(86) PCT No.: PCT/JP2014/065218
§ 371 (c)(1),
(2) Date: Dec. 7, 2016

(87) PCT Pub. No.: WO2015/189890
PCT Pub. Date: Dec. 17, 2015

(65) Prior Publication Data
US 2017/0118800 A1    Apr. 27, 2017

(51) Int. Cl.
| | |
|---|---|
| *H05B 3/36* | (2006.01) |
| *H05B 3/20* | (2006.01) |
| *H05B 3/10* | (2006.01) |
| *H05B 3/84* | (2006.01) |
| *H05B 3/86* | (2006.01) |
| *H05B 3/16* | (2006.01) |

(52) U.S. Cl.
CPC .................. *H05B 3/20* (2013.01); *H05B 3/16* (2013.01); *H05B 3/86* (2013.01); *H05B 2203/003* (2013.01); *H05B 2214/04* (2013.01)

(58) Field of Classification Search
CPC ... H05B 3/36; H05B 3/20; H05B 3/10; H05B 3/84–3/86
USPC .................................. 219/202–203, 522, 548
See application file for complete search history.

(56) References Cited

U.S. PATENT DOCUMENTS

| | | | |
|---|---|---|---|
| 3,947,618 A * | 3/1976 | Gruss | B32B 17/10036 |
| | | | 428/49 |
| 4,691,486 A | 9/1987 | Niekrasz | |
| 5,302,810 A * | 4/1994 | Gauthier | B29C 35/02 |
| | | | 219/209 |

(Continued)

FOREIGN PATENT DOCUMENTS

| | | |
|---|---|---|
| EP | 2315494 A1 | 4/2011 |
| JP | 53-047633 U | 12/1978 |

(Continued)

*Primary Examiner* — Michael Laflame, Jr.
(74) *Attorney, Agent, or Firm* — Heedong Chae; Lucem, PC

(57) ABSTRACT

A heat generating body (11) includes a polyimide resin film base material (12), a metal nanowire layer (14) arranged in a planar manner along one side of the polyimide resin film base material (12), and an electrode (5) connected electrically to the metal nanowire layer (14). The electrode (5) is connected electrically to the metal nanowire layer (14) via a polythiophene resin film layer (18). The heat generating body (11) also includes a triacetate resin film layer (13) arranged on the side of the polyimide resin film base material (12) on which the metal nanowire layer (14) is provided and formed of triacetate resin as an insulating material. The heat generating body (11) also includes a spacer portion (16) arranged between the layer (14) and the layer (13) and capable of forming an enclosed space (17) between the layer (14) and the layer (13).

5 Claims, 6 Drawing Sheets

(56) References Cited

U.S. PATENT DOCUMENTS

| | | | | |
|---|---|---|---|---|
| 6,906,287 B2* | 6/2005 | Sol | ............... | B32B 17/10036 |
| | | | | 15/250.05 |
| 6,919,536 B2* | 7/2005 | Veerasamy | ....... | B32B 17/10036 |
| | | | | 219/203 |
| 7,180,031 B1* | 2/2007 | Loibl | ............... | H05B 1/0227 |
| | | | | 174/68.1 |
| 2006/0099833 A1* | 5/2006 | Mann | ............... | B32B 17/10036 |
| | | | | 439/63 |
| 2006/0283084 A1* | 12/2006 | Johnson | ............... | F24D 13/026 |
| | | | | 49/1 |
| 2006/0292380 A1* | 12/2006 | Mann | ............... | B32B 17/10045 |
| | | | | 428/426 |
| 2010/0059495 A1* | 3/2010 | D'Haene | ............... | B32B 15/02 |
| | | | | 219/203 |
| 2011/0089160 A1* | 4/2011 | Kuriki | ............... | H05B 3/84 |
| | | | | 219/553 |
| 2011/0155713 A1* | 6/2011 | Wang | ............... | H05B 3/84 |
| | | | | 219/203 |

FOREIGN PATENT DOCUMENTS

| | | |
|---|---|---|
| JP | 61-084064 U | 6/1986 |
| JP | 62-237690 A | 10/1987 |
| JP | 11-314943 A | 11/1999 |
| JP | 3890334 B | 12/2006 |
| JP | 2007-102002 A | 4/2007 |
| JP | 2010-103041 A | 5/2010 |
| JP | 4470024 B2 | 6/2010 |
| JP | 2010-251230 A | 11/2010 |
| JP | 2013-251064 A | 12/2013 |
| KR | 10-2009-0099503 A | 9/2009 |
| WO | WO2012/073474 A1 | 7/2012 |

* cited by examiner

[Fig. 1]
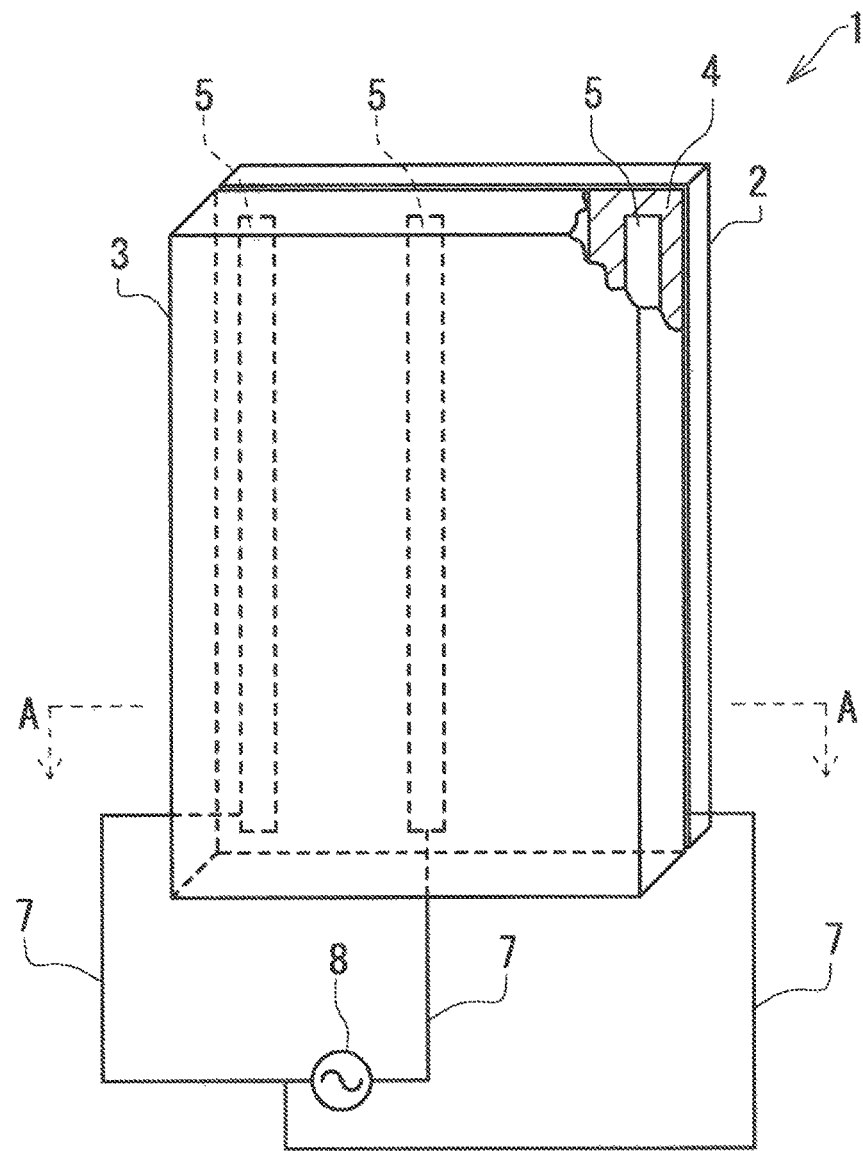

[Fig. 2]
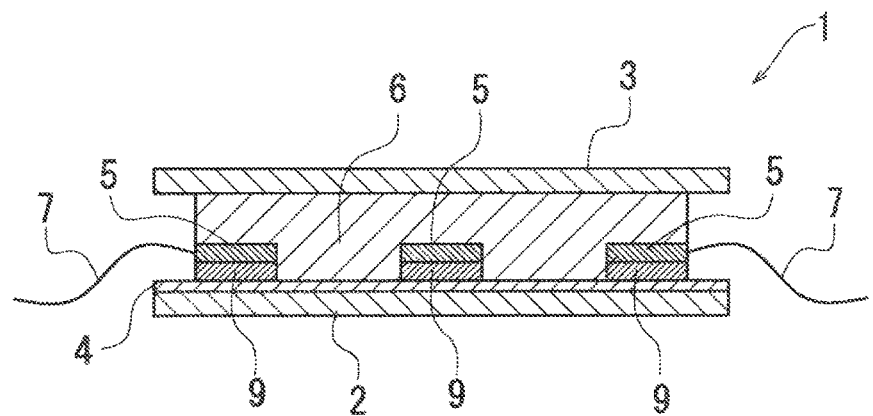
[Fig. 3]
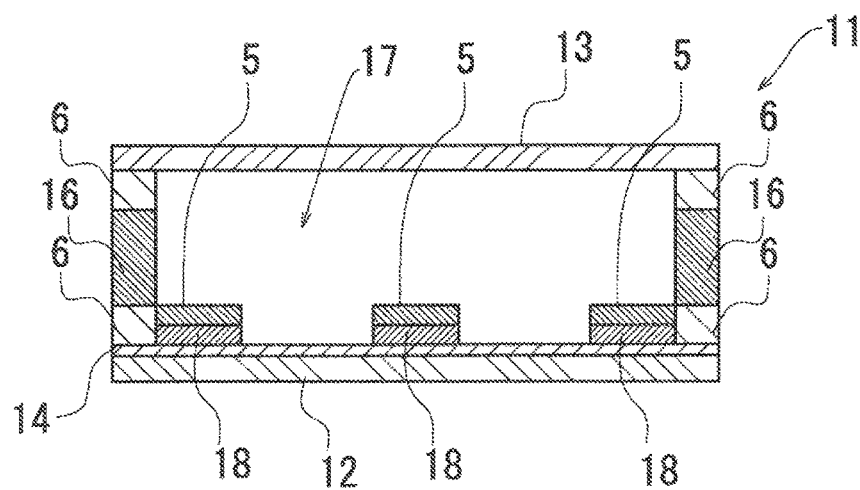

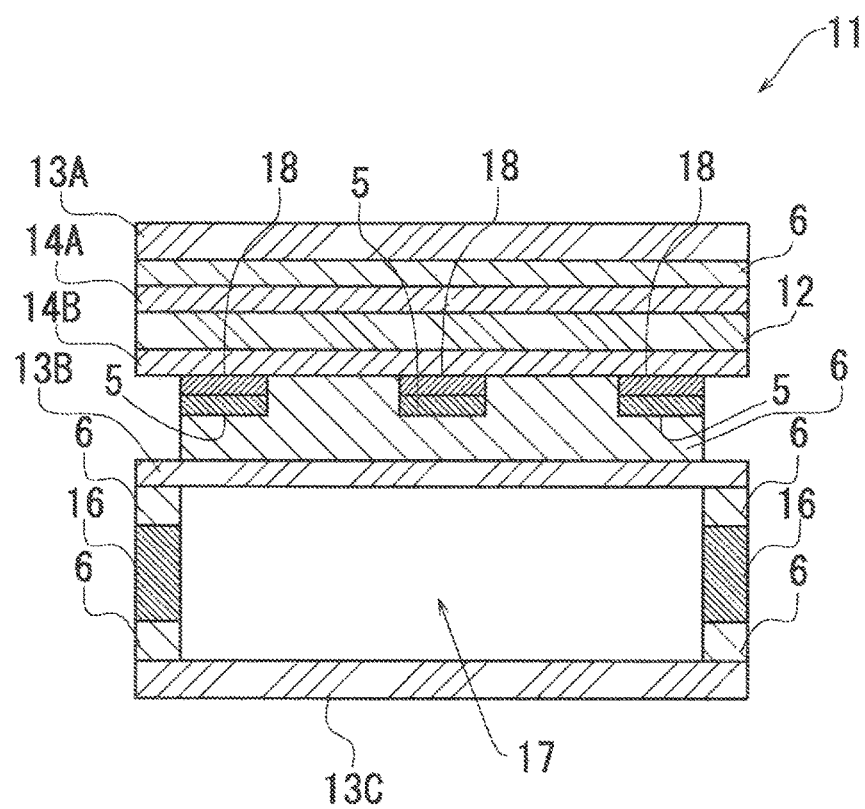
[Fig. 4]

[Fig. 5]
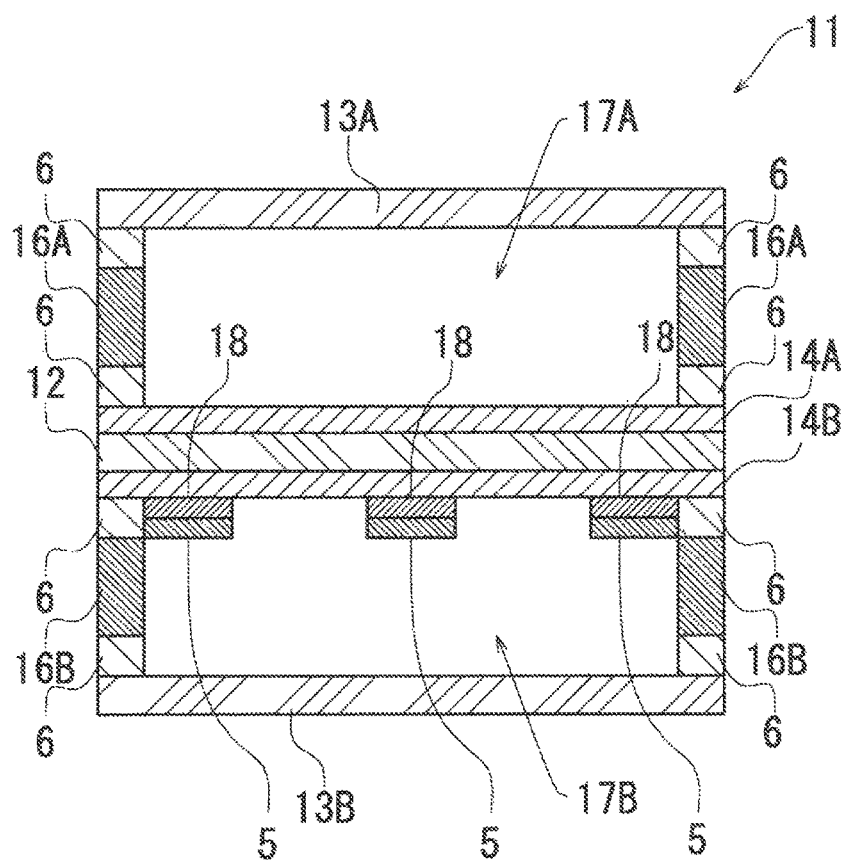

[Fig. 6]
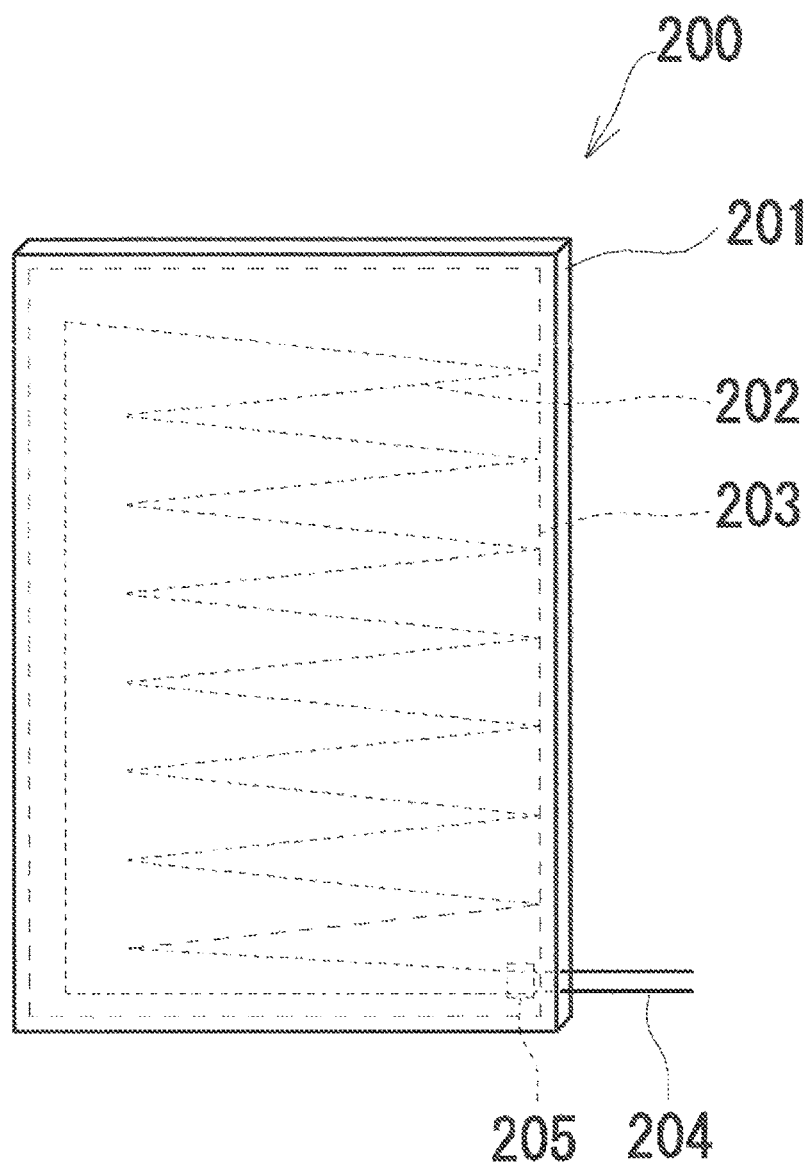

[Fig. 7]
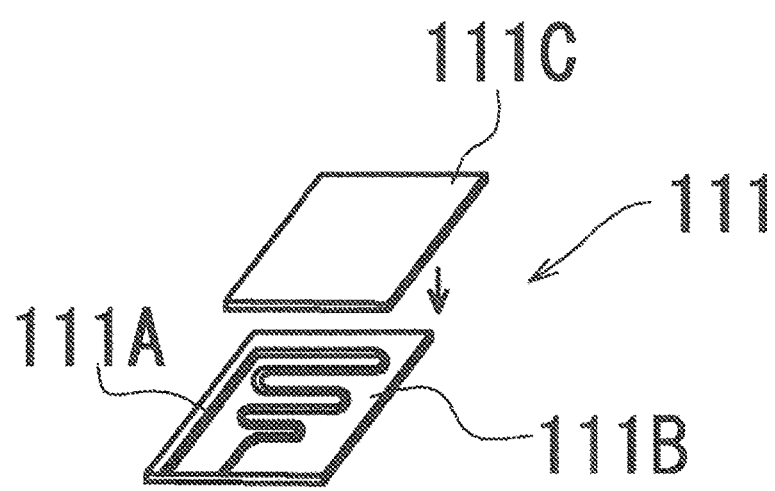

HEAT GENERATING BODY

BACKGROUND

Field of the Invention

The present invention relates to a heat generating body. Specifically, the present invention involves, for example, a heat, generating body to be installed on a window to suppress freezing and/or condensation on the window.

Background Art

Heat generating bodies that electrically generate heat are commonly used.

For example, a heat generating body may be mounted on the outer surface of a container to prevent freezing of or heat liquid within the container, or a heat generating body may be wound around fluid piping that needs to be kept warm to prevent the fluid temperature from decreasing.

Heat generating bodies that use an electrically heated wire are also well known.

For example, a heat generating portion of a heater as shown in FIG. 7 is described in Patent Document 1.

That is, the heat generating portion 111 described in Patent Document 1 includes a lower side material 111B, an electrically heated wire 111A, and an upper side material 111C.

The electrically heated wire 111A is wired into a predetermined serpentine pattern and mounted on the upper surface of the lower side material 111B and arranged to generate heat through energization thereof. The upper side material 111C is formed of the same material as the lower side material 111B and bonded to entirely cover the upper surface of the lower side material 111B on which the electrically heated wire 111A is wired.

CITATION LIST

Patent Literature

Patent Document 1: Japanese Patent No. 3890334

SUMMARY OF THE INVENTION

Technical Problem

However, such a heat generating portion using an electrically heated wire as described in Patent Document 1 is heated gradually and non-uniformly from the periphery of the electrically heated wire. As a result, it takes time to reach a desired high temperature.

There is also a possibility of disconnection, at a bent portion of the electrically heated wire.

The present invention has been made in view of the above-described circumstances and an object thereof is to provide a heat generating body that can reach a desired high temperature within a short period of time.

Solution to Problem

In order to achieve the foregoing object, a heat generating body according to the present invention includes a base material, a conductive layer arranged in a planar manner along the base material and formed of a conductive material, and an electrode connected electrically to the conductive layer.

The conductive layer being thus arranged in a planar manner along the base material and formed of a conductive material and the electrode being thus connected electrically to the conductive layer allows a current to flow through the conductive layer for uniform heat generation in the planar direction.

Also, in the heat generating body according to the present invention, the base material may be a resin plate or a resin film, and the conductive layer may be a wire mesh.

In this case, since both the base material and the conductive layer are flexible, the heat generating body can be installed along any object with various shapes.

The wire mesh can also reduce the surface resistance value significantly.

Also, in the heat generating body according to the present invention in which the base material is a resin plate or a resin film, the conductive material may be at least one selected from a mixture of a carbon-containing substance and a metal, a carbon-containing, substance, and a conductive polymer.

In this case, since both the base material and the conductive layer are flexible, the heat generating body can be installed along any object with various shapes.

Further, the heat generating body according to the present invention may include an insulating layer arranged on the side of the base material on which the conductive layer is provided and formed of an insulating material.

In this case, the strength increases and breakage is less likely to occur.

Since this also provides a structure in which the electrode is sandwiched between the base material and the insulating layer, the electrode can be protected and unexposed.

The heat generating body according to the present invention may also include a spacer portion arranged between the conductive layer and the insulating layer or a pair of insulating layers and capable of forming an enclosed space between the conductive layer and the insulating layer or the pair of insulating layers.

In this case, the enclosed space can increase the adiabaticity and thereby suppress the occurrence of condensation.

Also, in the heat generating body according to the present invention, the base material may have a rectangular plate shape, and the electrode may be connected electrically to the conductive layer along the edge of a long side of the base material.

In this case, the resistance value can be reduced.

Also, in the heat generating body according to the present invention, the electrode may be connected electrically to the conductive layer via a conductive polymer.

In this case, the conductive layer and the electrode come into close contact and integrate tightly with each other at the interface therebetween, whereby poor conduction is less likely to occur.

Also, in the heat generating body according to the present invention, the base material, the conductive layer, and the insulating layer may be translucent.

In this case, it is possible to install the heat generating body on any object that is necessary to be translucent.

Effect of the Invention

The heat generating body according to the present invention can reach a desired high temperature within a short period of time.

BRIEF DESCRIPTION OF THE DRAWINGS

FIG. 1 is a schematic view showing an example of a heat generating body according to a first embodiment to which the present invention is applied.

FIG. 2 is a schematic cross-sectional view showing a cross-section taken, along the line A-A in FIG. 1.

FIG. 3 is a schematic cross-sectional view showing a first example of a heat generating body according to a second embodiment to which the present invention is applied.

FIG. 4 is a schematic cross-sectional view showing a second example of the heat generating body according to the second embodiment to which the present invention is applied.

FIG. 5 is a schematic cross-sectional view showing a third example of the heat generating body according to the second embodiment to which the present invention is applied.

FIG. 6 is a schematic view showing a common electrically heated wire-included glass as a comparative counterpart.

FIG. 7 is a schematic exploded view showing a conventional heat generating body.

DESCRIPTION OF THE (PREFERRED) EMBODIMENTS

Embodiments of the present invention will hereinafter be described with reference to the accompanying drawings for understanding of the present invention.

FIG. 1 is a schematic view showing an example of a heat generating body according to a first embodiment to which the present invention is applied. FIG. 2 is a schematic cross-sectional view showing a cross-section taken along the line A-A in FIG. 1.

The heat generating body 1 according to the present invention shown in FIGS. 1 and 2 includes a rectangular plate-like glass base material 2. The glass base material 2 has a thickness of 3 mm. Here, the glass base material is an example of the base material.

The heat generating body 1 according to the present invention also includes a metal film 4 arranged in a planar manner along one side of the glass base material 2. Here, the metal layer is an example of the conductive layer.

Also, the metal film 4 is formed through metal deposition on the glass base material 2. Here, the metal is an example of the conductive material.

The metal used for formation of the metal film 4 is, for example, indium tin oxide (ITO), gold (Au), silver (Ag), copper (Cu), zinc oxide (ZnO), or tin oxide (SnO2).

The metal film 4 also has a thickness of 800 to 1200 angstroms and, more specifically, 1000 angstroms.

The metal film 4 also has a surface resistance value of 50 $\Omega/cm^2$ or less, preferably 30 $\Omega/cm^2$ or less, and more preferably 10 $\Omega/cm^2$.

The metal film, which has a surface resistance value of 50 $\Omega/cm^2$ or less, is likely to have a flow of electricity and thereby can reach a high temperature with a lower voltage.

The heat generating body 1 according to the present invention also includes electrodes 5 connected electrically to the metal film 4. Also, the electrodes 5 are each composed of a copper foil.

In the example shown in FIG. 1, the electrodes 5 are also provided, respectively, on both sides of the metal film 4 along the edges of the opposed long sides of the glass base material 2 and at approximately the center of the metal film 4.

Here, the electrode may not necessarily be provided at approximately the center of the conductive layer. It is also desirable that the electrode provided at approximately the center of the conductive layer may be as narrow as possible to ensure good visibility.

The electrodes 5 are each connected electrically to the metal film 4 via a polyacetylene resin film layer 9.

Here, the polyacetylene resin film is an example of the conductive polymer.

Since each electrode is connected electrically to the conductive layer via a conductive polymer such as a polyacetylene resin film, the conductive layer and each electrode come into close contact and integrate tightly with each other at the interface therebetween, whereby poor conduction is less likely to occur.

The electrodes 5 are each connected to a power cable 7. Each power cable 7 is also connected to a power source 8 arranged to supply power through each power cable 7 to each electrode 3.

The heat generating body 1 according to the present invention also includes a glass plate 3 arranged on the side of the glass base material 2 on which the metal film 4 is provided and formed of glass as an insulating material. The glass plate 3 has a thickness of 3 mm.

Here, the glass plate is an example of the insulating layer.

The glass plate 3 also has a rectangular plate-like shape.

Also, the glass base material 2 and the glass plate 3 have approximately the same area.

A butyl compound, for example, may also be applied from the end faces of the glass base material 2 to the end faces of the glass plate 3 to provide waterproofness.

An EVA (ethylene-vinyl acetate copolymer) resin film adhesive layer 6 is also arranged between the glass base material 2 and the glass plate 3, so chat the glass base material 2, on which the metal film 4 and the electrodes 5 are mounted, and the glass plate 3 adhere to each other.

That is, the metal film 4, the electrodes 5, the EVA resin film adhesive layer 6, and the polyacetylene resin film layer 9 are positioned between the glass base material 2 and the glass plate 3.

It is noted that in the partially notched portion of FIG. 1, the EVA resin film adhesive layer is not shown.

Instead of the EVA resin film, a PVA (polyvinyl alcohol) resin film or a PVB (polyvinyl butyral) resin film, for example, may also, be arranged as an adhesive layer.

However, the EVA resin film is preferably arranged as an adhesive layer to further increase the water resistance of the heat generating body.

Here, the conductive layer may not necessarily be arranged on only one side of the base material, but may of course be arranged on both sides of the base material.

The heat generating body according to the present invention may not necessarily include an insulating layer.

However, the heat generating body according to the present invention preferably includes an insulating layer to have an increased strength to be less likely to be broken and also provide a structure in which the electrodes are sandwiched between the base material and the insulating layer, whereby the electrodes can be protected and unexposed.

The electrodes may not necessarily be connected electrically to the conductive layer along the edges of the long sides of the base material.

However, the resistance value can preferably be reduced compared to the case where the electrodes are connected electrically to the conductive layer along the edges of the short sides because the resistance value is inversely proportional to the length of the base material.

The electrodes may not necessarily be composed of a copper foil, but may of course be composed of another metal such as indium tin oxide (ITO) or a silver foil.

Each electrode may not necessarily be connected electrically to the conductive layer via a conductive polymer, but may be connected electrically to the conductive layer with, for example, thermal compression or adhesive.

However, if the electrodes are preferably connected electrically to the conductive layer via the conductive polymers, the conductive layer and the electrodes come into close contact and integrate tightly with each other at the interfaces therebetween, whereby poor conduction is less likely to occur.

Besides the form of a thin film such as a metal film, the conductive layer may also have the form of a mesh such as a wire mesh.

Specifically, the wife mesh is, for example, a metal nanowire. Also, the metal composing the wire mesh is, for example, indium tin oxide (ITO), gold, silver, copper, or nickel.

Further, if the conductive layer is a wire mesh, the surface resistance value can be suppressed very low. For example, the surface resistance value may also be 10 $\Omega/cm^2$ or less.

The wire mesh is also resistant to bending and folding and can withstand even 180-degree folding.

The wire mesh, which can be thermally deformed, may also be deformed freely to fit the installation site, whereby the heat generating body can be installed in various locations.

Specifically, the conductive material forming the conductive layer is at least one selected from, for example, a mixture of a carbon-containing substance and a metal, a carbon-containing substance, that is, carbon, and a conductive polymer.

Specifically, the carbon-containing substance is, for example, carbon nanotube.

Specifically, the conductive polymer is, for example, polyethylene dioxythiophene (PEDOT) or polypyrrole (PPy).

Also, the mixture of a carbon-containing substance and a metal is an adhesive paste.

Specifically, the metal used for the mixture of a carbon-containing substance and a metal is, for example, gold, silver, copper, nickel, or metal oxide.

Specifically, the metal oxide is, for example, lead oxide, zinc oxide, silicon oxide, boron oxide, aluminum oxide, yttrium oxide, or titanium oxide.

Gold, silver, copper, nickel, metal oxide, or carbon microscopic particles may also be used.

The microscopic particles also have a grain size of several to tens of nanometers. The smaller the grain size, the finer the wiring can be made, while the larger the grain size, the lower the resistance value can be made. Specifically, the grain size is desirably 50 nm or less.

Also, the conductive layer, if not formed of a metal film but a wire mesh, an adhesive paste as a mixture of a carbon-containing substance and a metal, a carbon-containing substance, that is, carbon, or a conductive polymer, is more resistant to impact, less likely to be scarred, and less likely to have an increased surface resistance value than metal films.

Also, arranging the conductive layer in a planar manner on the base material using the metal composing the wire mesh, the mixture of a carbon-containing substance and a metal, the carbon-containing substance, or the conductive polymer may include the following methods.

There are, for example, a method of dissolving one of these conductive materials with solvent having a relatively low boiling point, coating the base material with the solution with the conductive material dissolved therein, and then heating the base material to a solvent evaporation temperature, a method of bonding one of these conductive materials to the base-material in a planar manner through so-called adhesive processing such as UV curing and thermal curing, and a printing method.

In the case of a metal film, the frequency of occurrence of a fine crack, that is, a microcrack would be high.

Also, since sputtering used for formation of a metal film would cause the bass material to have a high temperature, trying to form a metal film on a resin base material could potentially deform the base material unintentionally.

Also, in the case of formation of a metal film, it would be necessary to use relatively large-sized equipment.

In addition, in order to lower the surface resistance value, it would be necessary to thicken the metal film through sputtering. If the film is thickened, yellowing common to metal films will occur, lowering the transmittance.

The reduction in the transmittance would then make it difficult to install the heat generating body at a site where a high transmittance is required, such as on a window.

On the other hand, in the case of arranging the conductive layer in a planar manner on the base material using the metal composing the wire mesh, the mixture of a carbon-containing substance and a metal, the carbon-containing substance, or the conductive polymer, a printing method or a wet-coating method may be used to arrange the conductive layer relatively easily.

Also, since the printing method and the wet-coating method do not cause the base material to have a temperature as high as through sputtering, a resin base material such as a resin plate or a resin film can be adopted.

Then, if a resin base material such as a resin plate or a resin film can be adopted, the base material with a conductive layer provided thereon can be deformed freely and thus the heat generating body can be installed along an object to be heated.

For example, automobiles have three-dimensionally curved windows, on which flat and undeformable heat generating bodies such as those including a glass base material with a metal film provided thereon cannot be installed.

On the other hand, heat generating bodies including a resin plate base material or a resin film base material with a wire mesh, for example, provided thereon as a conductive layer can be installed precisely along the windows by deforming the base material using a heat gun or the like. This is because of both the flexibility of the base material and the flexibility of the conductive layer.

In particular, if the base material and the insulating layer are transparent and the conductive layer is a wire mesh, the heat generating bodies can be installed on, for example, automobile windows with a surface resistance value of 10 $\Omega/cm^2$ or less with the transmittance being kept at 90% or higher, although depending on the mesh width.

Also, in the case, where the conductive layer is arranged in a planar manner on the base material using the mixture of a carbon-containing substance and a metal, the carbon-containing substance, or the conductive polymer, the conductive layer arranged can be with high translucence. Accordingly, if the base material and/or the insulating layer are transparent, the heat generating body according to the present invention can preferably be installed on any object that is necessary to be translucent, such as a window.

Also, in the case of installing the heat generating body according to the present invention on an object that is necessary to be translucent, such as a window, the electrodes are preferably as narrow as possible.

FIG. 3 is a schematic cross-sectional view showing a first example of a heat generating body according to a second embodiment to which the present invention is applied.

The heat generating body 11 according to the present invention shown in FIG. 3 includes a polyimide resin film base material 12. Here, the polyimide resin film base material is an example of the base material.

The heat generating body 11 according to the present invention also includes a metal nanowire layer 14 arranged in a planar manner along one side of the polyimide resin film base material 12. Here, the metal nanowire is an example of the wire mesh and the wire mesh is an example of the conductive layer.

The metal nanowire layer 14 is also formed by a printing method on the polyimide resin film base material 12.

The heat generating body 11 according to the present invention also includes electrodes 5 connected electrically to the metal nanowire layer 14. Also, the electrodes 5 are each composed of a copper foil.

It is noted that the power cable and the power source are not shown.

The electrodes 5 are also provided, respectively, on both sides of the metal nanowire layer 14 along the opposed edges of the polyimide resin film base material 12 and at approximately the center of the metal nanowire layer 14.

The electrodes 5 are each connected electrically to the metal nanowire layer 14 via a polythiophene resin film layer 18.

Here, the polythiophene resin film is an example of the conductive polymer.

The heat generating body 11 according to the present invention also includes a triacetate resin film layer 13 arranged on the side of the polyimide resin film base material 12 on which the metal nanowire layer 14 is provided and formed of triacetate resin as an insulating material.

Also, the triacetate resin film layer is an example of the insulating layer.

The heat generating body 11 according to the present invention also includes a spacer portion 16 arranged between the metal nanowire layer 14 and the triacetate resin film layer 13 and capable of forming an enclosed space 17 between the metal nanowire layer 14 and the triacetate resin film layer 13.

As shown in the figure, the spacer portion 16 is also arranged outside the electrodes 5.

An EVA resin film adhesive layer 6 is also arranged between one side of the spacer portion 16 and the metal nanowire layer 14, whereby the one side of the spacer portion 16 and the metal nanowire layer 14 adhere to each other.

An EVA resin film adhesive layer 6 is also arranged between the other side of the spacer portion 16 and the triacetate resin film layer 13, whereby the other side of the spacer portion 16 and the triacetate resin film layer 13 adhere to each other.

That is, the enclosed space 17 is a space surrounded by the metal nanowire layer 14, the triacetate resin film layer 13, and the spacer portion 16.

A desiccant is also placed within the spacer portion 16, although not shown.

This desiccant dries the air within the enclosed space 17.

The thus formed enclosed space 17 can increase the adiabaticity and thereby suppress occurrence of condensation.

Also, inert gas such as argon gas or tryptone gas may of course be encapsulated within the enclosed space 17 or the enclosed space 17 may be evacuated to increase the adiabaticity.

FIG. 4 is a schematic cross-sectional view showing a second example of the heat generating body according to the second embodiment to which the present invention is applied.

The heat generating body 11 according to the present invention shown in FIG. 4 includes a polyimide resin film base material 12.

The heat generating body 11 according to the present invention also includes a first metal nanowire layer 14A arranged in a planar manner along one side of the polyimide resin film base material 12 and a second metal nanowire layer 14B arranged in a planar manner along the other side of the polyimide resin film base material 12.

The first metal nanowire layer 14A and the second metal nanowire layer 14B are also formed by a printing method on the polyimide resin film base material 12.

The heat generating body 11 according to the present invention also includes a first triacetate resin film layer 13A adhering via an EVA resin film adhesive layer 6 to the first metal nanowire layer 14A that is arranged in a planar manner along one side of the polyimide resin film base material 12.

The heat generating body 11 according to the present invention also includes electrodes 5 connected electrically to the second metal nanowire layer 14B that is arranged in a planar manner along the other side of the polyimide resin film base material 12. Also, the electrodes 5 are each composed of a copper foil.

It is noted that the power cable and the power source are not shown.

The electrodes 5 are also provided, respectively, on both sides of the second metal nanowire layer 14B along the opposed edges of the polyimide resin film base material 12 and at approximately the center of the second metal nanowire layer 14B.

The electrodes 5 are each connected electrically to the second metal nanowire layer 14B via a polythiophene resin film layer 18.

The heat generating body 11 according to the present invention also includes a second triacetate resin film layer 13B arranged on the side of the polyimide resin film base material 12 on which the second metal nanowire layer 14B is arranged with the electrodes 5 provided thereon.

An EVA resin film adhesive layer 6 is also arranged between the second metal nanowire layer 14B with the electrodes 5 provided thereon and the second triacetate resin film layer 13B.

The second metal nanowire layer 14B with the electrodes 5 provided thereon and the second triacetate resin film layer 13B then adhere to each other.

That is, the second metal nanowire layer 14B, the polythiophene resin film layer 18, the electrodes 5, and the EVA resin film adhesive layer 6 are positioned between the polyimide resin film base material 12 and the second triacetate resin film layer 13B.

The heat generating body 11 according to the present invention also includes a third triacetate resin film layer 13C arranged on the side of the second triacetate resin film layer 13B, opposite to the electrodes 5, which adheres to the second metal nanowire layer 14B with the electrodes 5 provided thereon.

The heat generating body 11 according to the present invention also includes a spacer portion 16 arranged between the second triacetate resin film layer 13B and the third triacetate resin film layer 13C.

An EVA resin film adhesive layer 6 is also arranged between one side of the spacer portion 16 and the second triacetate resin film layer 13B, whereby the one side of the spacer portion 16 and the second triacetate resin film layer 13B adhere to each other.

An EVA resin film adhesive layer 6 is also arranged between the other side of the spacer portion 16 and the third triacetate resin film layer 13C, whereby the other side of the spacer portion 16 and the third triacetate resin film layer 13C adhere to each other.

The spacer portion 16 can then form an enclosed space 17 between the second triacetate resin film layer 13B and the third triacetate resin film layer 13C.

That is, the enclosed space 17 is a space surrounded by the second triacetate resin film layer 13B, the third triacetate resin film layer 13C, and the spacer portion 16.

A desiccant is also placed within the spacer portion 16, although not shown.

This desiccant dries the air within the enclosed space 17.

FIG. 5 is a schematic cross-sectional view showing a third example of the heat generating body according to the second embodiment to which the present invention is applied.

The heat generating body 11 according to the present invention shown in FIG. 5 includes a polyimide resin film base material 12.

The heat generating body 11 according to the present invention also includes a first metal nanowire layer 14A arranged in a planar manner along one side of the polyimide resin film base material 12 and a second metal nanowire layer 14B arranged in a planar manner along the other side of the polyimide resin film base material 12.

The first metal nanowire layer 14A and the second metal nanowire layer 14B are also formed by a printing method on the polyimide resin film base material 12.

The heat generating body 11 according to the present invention also includes a first triacetate resin film layer 13A arranged on the side of the first metal nanowire layer 14A that is arranged in a planar manner along one side of the polyimide resin film base material 12.

The heat generating body 11 according to the present invention also includes a first spacer portion 16A arranged between the first metal nanowire layer 14A and the first triacetate resin film layer 13A.

An EVA resin film adhesive layer 6 is also arranged between one side of the first spacer portion 16A and the first metal nanowire layer 14A, whereby the one side of the first spacer portion 16A and the first metal nanowire layer 14A adhere to each other.

An EVA resin film adhesive layer 6 is also arranged between the other side of the first spacer portion 16A and the first triacetate resin film layer 13A, whereby the other side of the first spacer portion 16A and the first triacetate resin film layer 13A adhere to each other.

The first spacer portion 16A can then form a first enclosed space 17A between the first metal nanowire layer 14A and the first triacetate resin film layer 13A.

That is, the first enclosed space 17A is a space surrounded by the first metal nanowire layer 14A, the first triacetate resin film layer 13A, and the first spacer portion 16A.

The heat generating body 11 according to the present invention also includes electrodes 5 connected electrically to the second metal nanowire layer 14B. Also, the electrodes 5 are each composed of a copper foil.

It is noted that the power cable and the power source are not shown.

The electrodes 5 are also provided, respectively, on both sides of the second metal nanowire layer 14B along the opposed edges of the polyimide resin film base material 12 and at approximately the center of the second metal nanowire layer 14B.

The electrodes 5 are each connected electrically to the second metal nanowire layer 14B via a polythiophene resin film layer 18.

The heat generating body 11 according to the present invention also includes a second triacetate resin film layer 13B arranged on the side of the polyimide resin film base material 12 on which the second metal nanowire layer 14B is arranged with the electrodes 5 provided thereon.

The heat generating body 11 according to the present invention also includes a second spacer portion 16B arranged between the second metal nanowire layer 14B and the second triacetate resin film layer 13B.

As shown in the figure, the second spacer portion 16B is also arranged outside the electrodes 5.

An EVA resin film adhesive layer 6 is also arranged between one side of the second spacer portion 16B and the second metal nanowire layer 14B, whereby the one side of the second spacer portion 16B and the second metal nanowire layer 14B adhere to each other.

An EVA resin film adhesive layer 6 is also arranged between the other side of the second spacer portion 16B and the second triacetate resin film layer 13B, whereby the other side of the second spacer portion 16B and the second triacetate resin film layer 13B adhere to each other.

The second spacer portion 16B can then form a second enclosed space 17B between the second metal nanowire layer 14B and the second triacetate resin film layer 13B.

That is, the second enclosed space 17B is a space surrounded by the second metal nanowire layer 14B, the second triacetate resin film layer 13B, and the second spacer portion 16B.

A desiccant is also placed within each of the first spacer portion 16A and the second spacer portion 16B, although not shown.

This desiccant dries the air within each of the first enclosed space 17A and the second enclosed space 17B.

Experimental Example

Next, for a heat generating body 1 according to a first embodiment of the present invention and a common electrically heated wire-included glass, the glass plate was electrically heated and the temperature of the glass plate was measured every 5 minutes.

FIG. 6 is a schematic view showing a common electrically heated wire-included glass as a comparative counterpart.

The electrically heated wire-included glass 200 shown in FIG. 6 includes a rectangular planar glass plate 201 and a planar heater plate 203 mounted on one side of the glass plate 201.

A serpentine electrically heated wire 202 is also provided in the heater plate 203.

The electrically heated wire 202 is also connected via a connector 205 to a power cable 204 for supplying power from a power source not shown to the electrically heated wire 202.

Also, the glass plate 3 of the heat generating body 1 according to the present invention has the same area as the glass plats 201 of the electrically heated wire-included glass 200.

The metal film 4 of the heat generating body 1 according to the present invention was then supplied with power via the electrodes 5 and the glass plate 3 was heated for 20 minutes, during which the temperature of the glass plate 3 was measured every 5 minutes. The results are shown in Table 1 as a practical example.

The electrically heated wire 202 of the electrically heated wire-included glass 200 was also supplied with power and the glass plate 201 was heated for 20 minutes, during which the temperature of the glass plate 201 was measured every 5 minutes. The results are shown in Table 1 as a comparative example.

Also, the voltage applied to the heat generating body 1 according to the present invention was 30 V, while the voltage applied to the electrically heated wire-included glass 200 was 100 V.

TABLE 1

| | Initial value | 5 minutes later | 10 minutes later | 15 minutes later | 20 minutes later |
|---|---|---|---|---|---|
| Practical example | 21° C. | 31° C. | 36.0° C. | 38.0° C. | 40.5° C. |
| Comparative example | 21° C. | 25° C. | 26.5° C. | 27.5° C. | 28.0° C. |

As can be found from Table 1, for the heat generating body 1 according to the present invention, the temperature of the glass plate 3 exceeded 30° C. as soon as 5 minutes after the start of the power supply, while for the electrically heated wire-included glass 200, the temperature of the glass plate 201 did not exceed 30° C. even 20 minutes after the start of the power supply.

As described heretofore, since the heat generating body according to the present invention includes the conductive layer arranged in a planar manner along the base material and formed of a conductive material and the electrode connected electrically to the conductive layer, it is possible to cause a current to flow through the conductive layer for uniform heat generation in the planar direction.

Accordingly, the heat generating body according to the present invention can reach a desired high temperature within a shorter period of time than a conventional electrically heated wire-based heat generating body.

In particular, adopting a resin base material such as a resin plate or a resin film and then arranging the conductive layer in a planar manner on the base material using the metal composing the wire mesh, the mixture of a carbon-containing substance and a metal, the carbon-containing substance, or the conductive polymer allows the heat generating body according to the present invention to be installed along a sterically curved object.

The heat generating body according to the present invention also includes highly transparent resin films such as a polyimide resin film and a triacetate resin film and also includes a metal nanowire layer having a high transmittance and flexibility as the conductive layer.

Accordingly, the heat generating body according to the present invention can be installed on, for example, three-dimensionally curved automobile windows to suppress freezing and/or condensation thereon and thereby to ensure visibility in cold climates and/or during cold months for increased safety.

The heat generating body according to the present invention can also be applied to, for example, building window-panes, partitions, bathroom mirrors, automobile windows, railcar windows, vessel windows, motorcycle windscreens, meter panels, thermal insulation windows of laboratory equipment, and heaters of laboratory equipment.

DESCRIPTION OF REFERENCE NUMERALS

1: Heat generating body, 2: Glass base material, 3: Glass plate, 4: Metal film, 5: Electrode, 6: EVA resin film adhesive layer, 7: Power cable, 8: Power source, 9: Polyacetylene resin film layer, 11: Heat generating body, 12: Polyimide resin film base material, 13: Triacetate resin film layer, 13A: First triacetate resin film layer, 13B: Second triacetate resin film layer, 13C: Third triacetate resin film layer, 14: Metal nanowire layer, 14A: First metal nanowire layer, 14B: Second metal nanowire layer, 16: Spacer portion, 16A: First spacer portion, 16B: Second spacer portion, 17: Enclosed space, 17A: First enclosed space, 17B: Second enclosed space, 18: Polythiophene resin film layer.

What is claimed is:

1. A heat generating body comprising:
   a base material comprising a resin plate or resin film, wherein said base material further comprises a first and a second side, wherein the second side of the base material lies opposite to the first side of the base material;
   a conductive layer arranged in a planar manner along the first side and the second side of the base material, wherein said conductive layer is formed of a conductive material;
   an electrode connected electrically to the conductive layer;
   at least two insulating layers, wherein each insulating layer is arranged on the side of the base material on which the conductive layer is provided and formed of an insulating material; and
   a first spacer portion and a second spacer portion, wherein each of the spacer portions are arranged between the conductive layer and the insulating layer or a pair of insulating layers and each of the spacer portions are capable of forming an enclosed space between the conductive layer and the insulating layer or a pair of insulating layers; and
   wherein the conductive layer comprises a first metal nanowire layer and a second metal nanowire layer wherein the first metal nanowire layer is arranged in a planar manner along the first side of the base material and the second metal nanowire layer is arranged in a planar manner along the second side of the base material, and
   wherein the first spacer portion is arranged on the first side of the base material and the second spacer portion is arranged on the second side of the base material.

2. The heat generating body according to claim 1, wherein the conductive material is at least one selected from a mixture of a carbon-containing substance and a metal, a carbon-containing substance, and a conductive polymer.

3. The heat generating body according to claim 1, wherein the base material has a rectangular plate shape, and the electrode is connected electrically to the conductive layer along the edge of a long side of the base material.

4. The heat generating body according to claim 1, wherein the electrode is connected electrically to the conductive layer via a conductive polymer.

5. The heat generating body according to claim 1, wherein the base material, the conductive layer, and the insulating layer are translucent.

\* \* \* \* \*